United States Patent
Moore

(10) Patent No.: US 7,124,190 B1
(45) Date of Patent: Oct. 17, 2006

(54) METHOD FOR VERIFYING CHRONOLOGICAL INTEGRITY OF AN ELECTRONIC TIME STAMP

(75) Inventor: James H. Moore, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/468,157

(22) Filed: Dec. 21, 1999

(51) Int. Cl.
*G06F 15/16* (2006.01)
(52) U.S. Cl. ...................... 709/229; 713/178
(58) Field of Classification Search ............ 713/178, 713/156, 176; 709/229
See application file for complete search history.

(56) References Cited

U.S. PATENT DOCUMENTS

| | | | | |
|---|---|---|---|---|
| 5,107,269 A * | 4/1992 | Labozzetta | ................... | 342/77 |
| 5,136,647 A * | 8/1992 | Haber et al. | ................ | 713/178 |
| 5,189,700 A * | 2/1993 | Blandford | ................... | 713/178 |
| 5,949,879 A * | 9/1999 | Berson et al. | .............. | 713/179 |
| 6,085,322 A * | 7/2000 | Romney et al. | ............ | 713/176 |
| 6,367,013 B1 * | 4/2002 | Bisbee et al. | ............... | 713/178 |
| 6,381,696 B1 * | 4/2002 | Doyle | ........................ | 713/156 |
| 6,393,126 B1 * | 5/2002 | van der Kaay et al. | ..... | 380/241 |
| 6,785,810 B1 * | 8/2004 | Lirov et al. | ................. | 713/165 |
| 6,839,879 B1 * | 1/2005 | Hwang | ....................... | 715/511 |

OTHER PUBLICATIONS

"Applied Cryptography", 2nd Edition by Bruce Schneider.*
"Security in Computing", 2nd Edition by Charles P. Pfleeger.*

* cited by examiner

*Primary Examiner*—David Wiley
*Assistant Examiner*—Kyung Hye Shin
(74) *Attorney, Agent, or Firm*—Fay, Sharpe, Fagan, Minnich & McKee, LLP

(57) ABSTRACT

A method for securing the chronological integrity of files prior to archiving of the files, involving an exchange between a client and a Time Source Provider, the method comprising the steps of: the client generating a Public and a Private Key pair; the client generating attributes of the to be archived files; encrypting the client's files utilizing the client's Public Key; transmitting the encrypted data attributes and key signature to said Time Source Provider; the Time Source Provider creating a TimeMap containing the current time, time calibration data, file attributes and client encryption key signature; and the Time Source Provider providing the client data and time map back to the client.

14 Claims, No Drawings

METHOD FOR VERIFYING CHRONOLOGICAL INTEGRITY OF AN ELECTRONIC TIME STAMP

FIELD OF THE INVENTION

This invention relates to the field of electronic document verification, and more particularly, to those methods of verifying the date and time of existence of electronic documents or files.

BACKGROUND OF THE INVENTION

In the arts organizations interested in protecting intellectual property or investigatory bodies, e.g. local and state police, FBI, private investigators, and the like, it is important to be able to verify ownership and time/date of creation of electronic papers and other electronic recordations thereby legally establishing what has happened, when something happened, and by whom. Since electronic media is alterable, establishing the accuracy of ownership and the date/time of creation can be difficult because computer system clocks can be set to inaccurate dates and/or times and electronic documents or files can be readily altered.

Much work has been done to date in the electronic document security and verification area in regards to the "what" and "by whom" (called non-repudiation) but typically time is not included in electronic non-repudiation because it is easy to set and change on computers. To overcome this, time of creation of electronic documents is established by other means such as sequencing of events. Emails are a good example of this. The order of emails sent and received can help investigators narrow down the time and date of creation by their order in the sequence. But, for other documents or files this sequencing for time and date of creation is not viable and, as the world quickly progresses to an electronic "paperless" environment, solid techniques for establishing originality and time and date of origin are increasingly needed.

In order to secure passwords, system executables and high value data secure hash algorithms often are used to produce a "signature" that can later be verified as originating from the owner. To secure data transmission integrity, several steps are typically employed. For instance, files are frequently combined into a "folder" or some other archive format and a data signature is generated of the archive file. Afterwards, the original archived file and its signature is placed in another archive file which is then encrypted with a private key. The use of a certification authority or certificate authority can be additionally employed to ensure integrity of originality. For example, to support digital signatures, a trusted third party verifies the identity of that person or entity and then issues a digital certificate to the user that they sign digitally. The receiving person then verifies the digital signature as coming from a certified party.

There are cryptographic two signature algorithms in popular use, MD5 by RSA Data Security Inc and SHA1 by National Institute of Standards and Technology. Snefru was a signature algorithm developed by Xerox Corp, but is not used extensively. MD5 is the most common, but is also regarded as being likely to be compromised in the not too distant future. SHA1 was basically designed as an open standard signature algorithm, but some trust the cryptographic strength behind it less than MD5 because of the general reputation of RSA.

At this point all of the focus on compromise of signature algorithms has been on the prevention replacement of an existing file with a substitute file with the same signature. What will also be needed is to prevent the creation of a file with the same signature which can be associated with a previously generated time. Associating a signature with a file, its file size, and potentially with the signature of an encrypted transform of the file, and the signature of the encryption key is what this invention will use to prevent this type of forgery.

In cryptography, there are various techniques of enhancing the "cryptographic" strength of a solution. Such techniques often involve the use of multiple encryptions or the use of encryptions where keys are of limited use (e.g. session keys). In mathematics there is a whole field of study in error correcting codes. Applications in the computer field include parity bits. But error correcting codes extend to where errors can be both detected and corrected. For recoverability of a reliable time of existence, and the attributes of the files associated with the time, error detection and correction will be employed. Use of error correcting codes in itself is a mathematical transformation of the electronic data. This invention will utilize error correcting codes to increase integrity, but also to increase cryptographic strength.

What is needed in the art and what is provided by this invention, is a method for securing the integrity of the time of existence of documents or files in preparation archiving such that the files' origin and authenticity can be subsequently verified.

SUMMARY OF THE INVENTION

What is presented is a novel method of securing the chronological integrity of files prior to archiving such that the files' origin and authenticity can be subsequently and readily verified. The method of the present invention involves the steps wherein the client first generates or otherwise acquires a Public and a Private Key pair. Preferably, the key pair is associated with an organization/corporate unit, or individual. If the key pair is reserved for archiving then the risk of exposure and compromising is decreased. Commercial or private key infrastructures can be leveraged in this acquisition, but are not required. The client then generates a list of files to be archived along with the files' respective file sizes and cryptographic signatures.

The files data are then encrypted utilizing the client's Public Key. The client transmits the encrypted files to a Time Source Provider along with the client's Public Key. The associated attributes of the files, sizes, cryptographic signatures, etc, as well as the cryptographic signatures of both the Public and Private Keys, (also referred to as key fingerprints) are then encrypted first with the Private Key of the Client and then the Public Key of the Time Source Provider. The Time Source Provider then decrypts the message with its Private Key (preferably unique to the client). The result is then decrypted with the Client's Public Key, verifying that it was the client that had sent an encrypted package. The accuracy of the associated attributes of the files are also verified. The Time Source Provider uses the files and attributes list and current time to create a time map. This time map will use error correcting codes on one or more copies and one or more representations of time, as well as a transformation of the file attributes including sizes and cryptographic signature(s) together with the encryption key signatures provided by the client to scatter both the time representations and the file attributes, and signatures into a file of digital noise. The result is then encrypted with a session key that is unavailable to the client. The client's original message and the generated time map, the cryptographic signature of the time map, and the cryptographic signature of the key used to encrypt the time map are encrypted with the Time Source Provider's Private key.

This encrypted message is then provided back to the client. The client in turn decrypts the incoming message and verifies the signature of the time map for authenticity as having come from the designated Time Source Provider. The client then archives the files verifying sizes and signatures along with the file list including signatures, time and the time map. The client is then free to distribute the unencrypted files.

If the files themselves cannot be provided to the Time Source Provider for cryptographic signature verification due to perceived sensitivity, size, or other reasons, then the file attributes, together with both the cryptographic signature of the file and, a cryptographic signature of the file after encryption can be used. The cryptographic signature and the size of the encryption key used to encrypt the file must also be supplied. These additional attributes would then also be embedded in the time map. Existence of these attributes would indicate that the signatures were not verified. Additional strength can be added by adding file attributes in the form of cryptographic signatures of additional iterations of encryption with the same or different keys.

Additional benefits and advantages of the present invention will be set forth in the description which follows, and in part will be obvious from the description, or may be learned by the practice of this invention. The advantages of this invention, as described herein, may be realized and obtained by means particularly pointed out and distinctly claimed in the appended claims, taken in conjunction with the detailed specification.

DETAILED DESCRIPTION OF THE SPECIFICATION

The present invention provides a method for securing the chronological integrity of archived electronic documents or files as a means for certifying originality and ownership.

The present invention requires that there be a Time Source Provider, which is a separate entity (different from the client) providing a verifiable time stamp. Both the Time Source Provider and the Client require the ability to generate/acquire public and privates key pairs. They will also exchange the Public Keys used in a secure fashion. There necessarily entails an exchange between the client and a Time Source Provider as will become more evident herein. The client and the Time Source Provider each have their own Public Key and Private Keys.

It should be understood that various alternative embodiments of the present invention are envisioned herein. Such variations involve differing degrees of strength of service provided by a Time Source Provider.

Generally, the client has one or more files which the client desires to be authenticated as having originated by the client prior to archiving. The client utilizes the methodology of the present invention prior to archiving the selected files so that, in the future, should an instance arise wherein the client is called upon or otherwise has to authenticate the date and originality of a particular file, the archived version can be recalled and compared for authenticity. With the method of the present invention, authenticity can be assured at a subsequent date.

The present method involves the client first generating or otherwise acquiring a Public and a Private Key pair. Preferably, the key pair is associated with an organization/corporate unit, or individual. A commercial or internal public key infrastructures can be used. The client shares their Public Key with the Time Source Provider. The Time Source Provider similarly generates or acquires a Public and Private Key pair for use in transactions with the client, and shares the Public Key with the client.

The client then generates a list of files to be archived along with the files' respective file sizes and cryptographic signatures. The files are then encrypted utilizing the client's Public Key. The cryptographic signatures are generated for the encrypted files, and the cryptographic signature of the Public Key used to encrypt the files is generated. Some clients might not want to reveal file names for security reasons, so optionally, the client could use a filename lookup table. The signature of that lookup table would need to be included in the exchange of encrypted data between the client and the Time Source Provider. The client then encrypts the encrypted files and associated data first with their Private Key and then with the Time Source Provider's Public Key and transmits the encrypted files and data to a Time Source. This initiates the transaction. It is important to note that the medium of transport between the Time Source Provider and the client can be an internet service, or a dial-up connection, or some other protocol agreed to by the parties. The Time Source Provider then decrypts the message first with the Time Source Provider's Private Key and then with the client's Public Key. The Time Source Provider verifies any signature of the client and the accuracy of the size and cryptographic signature attributes of the included files. If the client has not included the encrypted files, then the data provided by the client of signatures of the files after one or more iterations through encryption and the encryption key signatures are verified for format only. The Time Source Provider uses the files and attributes list and current time to create a time map.

The Time Map is a Session Key encrypted map of the time of recording of the client's file information together with the actual information preferably scattered according to a function determined by the number of files, their sizes, their signatures and the current time. Preferably the time would be multiply represented and error correction codes applied. Also recorded in the time map is the time source, last synchronization to clock, location of the clock, last calibration of the clock, and the last time that the encryption key(s) for data exchange were updated. The session key used to encrypt the time map is never shared with the client but is itself encrypted, and transmitted to a secured storage location along with the time map itself. The storage location preferably would not allow the information to be online in a network connected fashion for any length of time. The information from the list would be selected to place the bits representing an absolute or relative time (or both) for a number of copies of the time (more than 1 for reasons of error detection and correction). Also embedded in the time map would be the list of files, file sizes, signatures, and any signatures of encrypted files. Also injected therein would be a fairly high volume (e.g. >70%) of digital noise.

Session Key exchange between the Time Source Provider and the client is known in cryptography texts such as the one by Bruce Schneier, Applied Cryptography 2 Ed. Session keys are usually symmetric keys such as DES because they are often much faster than Public Key/Private Key cryptography. The session keys can be any encryption algorithm. Session Keys can also be used between client and Time Source Provider if additional security is required for the encryption of data file and attribute during transmission.

The client's original message and the generated time map are encrypted with the Time Source Provider's Private Key.

Time map and session key signatures are returned to the client. Client has responsibility for archiving files, time map and the associated encryption key(s). The client in turn decrypts the incoming message and verifies the signature of the time map for authenticity as having come from the designated Time Source Provider. The client then archives the files verifying sizes and signatures along with the file list including signatures, time and the time map. The client is then free to then distribute the unencrypted files.

In the event of request for legal verification of authenticity and/or the time of archival of files, the client would only have to produce the archived file and any encryption keys used by the client. The Time Source Provider would provide evidence by retrieving the time map and the Session Key, regenerating the time map, from the components provided by the client, and encrypting it with the time map session key. The originality of the time and time map is then readily verified by comparing the regenerated time map to the time map in the possession of both the client and the Time Source Provider.

The Public Keys, the Session Keys, and the encrypted time map could be exchanged in X.509 or other format certificates known in the arts. Digital certificates add to the complexity of compromise, especially for "man in the middle" attacks where an interloper poses to be the client to the supplier, and the supplier to the client. Because encryption keys can be copied if inadequately protected, adding a multi-factor authentication, such as a token or GPS would also add to the complexity of compromise. If a multi-factor authentication scheme such as SecurID™, Cryptocard™, or another system is used in conjunction with the exchange, it would also add to the security.

In the event wherein the timestamp is challenged, in the instance where a claim is made that the files are newer than the timestamp, the timestamp was inaccurate, or someone other than the timestamping authority provided the timestamp, the client could show that the time map associated with one or more specific files could not have been deciphered, changed, nor reproduced by the client. If the timemap had been deciphered and substituted by the client, the client would have also had to compromise the stores of the session keys and the signature of the time map which are independently verifiable in the archives of the Time Source Provider. In addition, the time map reflects the time and the size and secure hash of the files in the scattering of time having been generated by the Time Source Provider during that particular timestamping session. The time map could only have been accurately regenerated from files of the same sizes and secure hashes and only at the exact times listed in the time map. In order to make this event even more unlikely the client's encryption key fingerprint would also preferably be embedded in the time map generated by the Time Source Provider.

In the event that Company "A" is working on something that Company "B" is also working on and Company A wants to make sure that Company B does not complete the work first and perhaps gain market share, Company A might try to intercept Company B's files on their way to be time stamped at the Time Source Provider (provided that this information was known to Company A). This would require Company A breaking the encryption that Company B uses with any given set of files and breaking that encryption and the time map as well. The methodology of the present invention thereby makes it even all the more difficult for industrial type espionage to have any likelihood of success.

In the instance of a "man in the middle" attack, where someone positions themselves to pretend to be the Time Source Provider, several alternatives could additionally be employed. For example, the keys exchanged between the client and the Time Source Provider could be embedded in any number of digital certificates thereby allowing for secure future checks from an independent Certificate Authority. In addition, the keys could be exchanged "out of band", i.e. not over the network or internet. And for a slightly more secure method, one could use the public key encryption to negotiate one or more Session Keys to be used just for individual time stamping transactions.

Additionally, a "clear channel" transaction should take place on a periodic basis initiated by the client side which the time source would decrypt, and recognize the pattern, verifying that transmissions from the client weren't being blocked. In the "clear channel" transaction, the time until the next "clear channel" and the pattern could be exchanged. This "clear channel" transaction could be encrypted using the same customer number keys used in normal transactions, so as not to alert an interceptor or some other entity desiring to disrupt communication therebetween. Not receiving a "clear channel" by either party would trigger an alarm or warning of some kind at the Time Source Provider's end. The "clear channel" exchange could also embed an NTP transaction (the network time protocol) which would be a value added for the client as it could verify its internal time with the highly reliable time used by the Time Source Provider. The Time Source Provider could also record the drift of client's internal clocks.

The Time Source Provider could also be setup so as to never be in a position to handle any unencrypted client files. Additionally, the integrity of the time acquisition software, and the time map generation software could be verified by a third party. Non-repudiation (digital signature) products exist such as Approvit—Silanis Technology, which focus on document management and an approval. The Approvit package can detect alteration, but has no means of securing the timestamp (using the PC's own clock). Similarly, common digital signatures are not configured to prevent the acquisition of a timestamp followed by the generation of a file to match the file attributes.

In summary, what is presented is a novel method of securing the integrity of files prior to archiving such that the files' origin and authenticity can be subsequently and readily verified. The method of the present invention involves the steps wherein the client first generates or otherwise acquires a Public and a Private Key pair. Preferably, the key pair is associated with an organization/corporate unit, or individual. If the key pair is reserved for archiving then the risk of exposure and compromising is decreased. Commercial or private key infrastructures can be leveraged in this acquisition, but are not required. The client then generates a list of files to be archived along with the files' respective file sizes and cryptographic signatures. The files data are then encrypted utilizing the client's Public Key. The client transmits the encrypted files to a Time Source Provider along with the client's Public Key. The associated attributes of the files, sizes, cryptographic signatures, etc, as well as the cryptographic signatures of both the public and private keys, (also referred to as key fingerprints) are then encrypted first with the Private Key of the Client and then the Public Key of the Time Source Provider. The Time Source Provider then decrypts the message with its Private Key (preferably unique to the client). The result is then decrypted with the Client's Public Key, verifying that it was the client that had sent an encrypted package. The accuracy of the associated attributes of the files are also verified. The Time Source Provider uses the files and attributes list and current time to create a time map. This time map will use error correcting codes on one or more copies and one or more representations of time, as well as a transformation of the file attributes (including sizes and cryptographic signature(s)) together with the encryption key signatures provided by the client to scatter both the time representations and the file attributes, and signatures into a file of digital noise. The result is then encrypted with a session key that is unavailable to the client. The client's original message and the generated time map, the cryptographic signature of the time map, and the cryptographic signature of the key used to encrypt the time map are encrypted with the Time Source Provider's Private Key. This encrypted message is then provided back to the client. The client in turn decrypts the incoming message and verifies the signature of the time map for authenticity as having come from the designated Time Source Provider. The client then archives the files verifying sizes and signatures along with the file list including signatures, time and the time map. The client is then free to distribute the unencrypted files.

With the above-described detailed description of the preferred embodiment (and the alternative embodiment) of the present invention and the above-described variations thereto, one skilled in the art of computer architecture and programming will readily find their specific implementation in accordance herewith.

This invention may be embodied in other specific forms without departing from its spirit or essential characteristics. The above-described embodiments are to be considered in all respects only as illustrative and not restrictive in scope. The scope of the invention is, therefore, indicated by the appended claims rather than by the above-detailed description. Therefore, all changes which come within the meaning and range of equivalency of the claims are to be considered embraced within their scope.

What is claimed is:

1. A method for securing the integrity of files prior to archiving of the files, involving an exchange between a client and a Time Source Provider, the method comprising the steps of:
   the client generating a Public and a Private Key pair that is associated with an organization, a corporate unit or an individual;
   the Time Source Provider generating a Public and Private Key pair for use in transactions with the client;
   the client generating attributes of the files that are to be archived, the attributes including file sizes and cryptographic signatures;
   encrypting the client's files with the client's Private Key and then with the Time Source Provider's Public Key;
   transmitting the encrypted data and file attributes and the client's Public Key signature to the Time Source Provider;
   the Time Source Provider decrypting the encrypted data and file attributes with the Time Source Provider's Private Key and then with the client's Public Key;
   the Time Source Provider creating a Time Map containing the current time, time source calibration data, file attributes and signatures of any encryption keys used by the client;
   the Time Source Provider returning the client's data along with the time map and session key signature;
   the Time Source Provider providing the encrypted client data back to the client; and
   the client archiving the original files, file attributes and the time map from the Time Source Provider.

2. A method as in claim 1, where the client provides multiple encryption of files, generating the signature of the file at each step, and providing all signatures along with the encryption key signatures to the Time Source Provider for inclusion of the time map.

3. A method as in claim 1 for application of multiple or differing error correcting codes to the representation of the time, the time source calibration data, the file attributes and encryption key signatures.

4. A method as in claim 1, further comprising the steps of:
   exchanging a session key between the client and Time Source Provider for use in generating the signatures of the encrypted files and for securing the transaction;
   the client producing the archived files, file attributes and time map;
   the Time Source Provider retrieving the time map and session key;
   the Time Source Provider regenerating the time map;
   the Time Source Provider encrypting the time map with the session key; and,
   comparing the regenerated time map to the time map.

5. A method as in claim 1, further comprising the steps of:
   establishing a clear channel transaction interval and pattern;
   the client encrypting the clear channel transaction using the client's Public and Private key pair;
   sending the clear channel transaction to the Time Source Provider;
   triggering an alarm if the clear channel transaction is not received by the Time Source Provider.

6. A method as in claim 1, further comprising the steps of:
   protecting the client's filenames via a filename lookup table having a signature;
   transmitting the signature of the filename lookup table to the Time Source Provider.

7. A method as in claim 1, further comprising the step of:
   recording in the time map at least one of the time source, last synchronization to clock, location of the clock, last calibration of the clock, and the last time that the encryption keys for data exchange were updated.

8. A method as in claim 7, further comprising the step of:
   recording in the time map at least one of the list of archived files, the sizes of the archived files, and the signatures of any encrypted files.

9. A method for securing the integrity of archived files for a client:
   establishing a public and private key pair for the client, wherein the client's public and private key pair is associated with an organization, a corporate unit or one or more individuals;
   generating a public and private key pair for use in transactions with the client;
   receiving a data transmission from the client over a clear channel, wherein the data transmission includes encrypted data and archived file attributes and the client's Public Key signature and wherein the archived file attributes include data relating to the sizes of the files and cryptographic signatures and the archived files have been encrypted with the client's private key and with the time source provider's public key;
   decrypting the encrypted data and file attributes with the time source provider's private key and then with the client's public key;
   creating a time map containing the current time, time source calibration data, file attributes and signatures of any encryption keys used by the client;
   transmitting the encrypted client data along with the time map and session key signature over the clear channel to the client.

10. The method as defined in claim 9, further comprising the steps of:
   protecting the client's filenames via a filename lookup table having a signature;
   transmitting the signature of the filename lookup table to the Time Source Provider.

11. The method as defined in claim 10, further comprising the step of:
   recording in the time map at least one of the time source, last synchronization to clock, location of the clock, last calibration of the clock, and the last time that the encryption keys for data exchange were updated.

12. The method as defined in claim 11, further comprising the step of:
   recording in the time map at least one of the list of archived files, the sizes of the archived files, and the signatures of any encrypted files.

13. The method as defined in claim 12, further comprising the step of:
   exchanging a session key between the client and the Time Source Provider for use in generating the signatures of the encrypted files and for securing the transaction;
   retrieving the time map and session key;
   regenerating the time map;
   encrypting the time map with the session key; and,
   comparing the regenerated time map the time map.

14. The method defined in claim 13, further comprising the step of:
   applying multiple or differing error correcting codes to the representation of the time, the time source calibration data, the file attributes and encryption key signatures.

* * * * *